United States Patent
Chen et al.

(10) Patent No.: US 7,376,179 B2
(45) Date of Patent: May 20, 2008

(54) METHODS AND CIRCUITS FOR OPTIMAL EQUALIZATION

(75) Inventors: Xi Chen, Fremont, CA (US); Bao Lenguyen, San Jose, CA (US); Wen-Chung (Stewart) Wu, Cupertino, CA (US)

(73) Assignee: Broadcom Corporation, Irvine, CA (US)

( * ) Notice: Subject to any disclaimer, the term of this patent is extended or adjusted under 35 U.S.C. 154(b) by 281 days.

(21) Appl. No.: 10/383,571

(22) Filed: Mar. 10, 2003

(65) Prior Publication Data

US 2003/0152166 A1    Aug. 14, 2003

Related U.S. Application Data

(63) Continuation of application No. 09/415,567, filed on Oct. 8, 1999, now Pat. No. 6,546,047.

(60) Provisional application No. 60/103,820, filed on Oct. 8, 1998.

(51) Int. Cl.
    *H03H 7/30*    (2006.01)
(52) U.S. Cl. .................................... 375/229
(58) Field of Classification Search ................ 375/229, 375/230, 231, 232, 233, 234, 235, 236; 708/323; 333/18, 281; 330/304
    See application file for complete search history.

(56) References Cited

U.S. PATENT DOCUMENTS

| | | | |
|---|---|---|---|
| 4,327,412 A | | 4/1982 | Timmons |
| 5,237,588 A | * | 8/1993 | Tanaka et al. ............ 375/230 |
| 5,245,561 A | * | 9/1993 | Sugiyama .................. 708/322 |
| 5,274,512 A | | 12/1993 | Tanaka et al. |
| 5,307,375 A | * | 4/1994 | Wu et al. .................. 375/236 |
| 5,481,564 A | * | 1/1996 | Kakuishi et al. ........... 375/230 |
| 5,483,552 A | * | 1/1996 | Shimazaki et al. ......... 375/233 |
| 5,517,213 A | | 5/1996 | Bhatt et al. |
| 5,590,154 A | * | 12/1996 | Forni et al. ................ 375/229 |
| 5,636,244 A | * | 6/1997 | Goodson et al. ........... 375/231 |
| 5,650,954 A | * | 7/1997 | Minuhin .................... 708/819 |
| 6,003,051 A | * | 12/1999 | Okazaki ....................... 708/3 |
| 6,115,418 A | * | 9/2000 | Raghavan .................. 375/233 |
| 6,144,697 A | * | 11/2000 | Gelfand et al. ............ 375/233 |
| 6,192,071 B1 | * | 2/2001 | Hirth et al. ................ 375/232 |
| 6,370,190 B1 | | 4/2002 | Young et al. |
| 6,389,062 B1 | | 5/2002 | Wu |

* cited by examiner

*Primary Examiner*—Sam K. Ahn
(74) *Attorney, Agent, or Firm*—Squire, Sanders & Dempsey, L.L.P.

(57) ABSTRACT

Methods and circuits utilizing a two stage adaptation algorithm to determine the optimal code for an equalizer to compensate a received signal is disclosed. In the first stage, a coarse tuning algorithm is used to choose a range of codes based on the amplitude of the received signal. The chosen codes will be used as reference points in the second stage. In the second stage, a fine tuning algorithm is used to select a code in the range of reference codes determined in stage one. The fine tuning algorithm looks to the status of the data lock signal generated by the clock recovery circuit. If the data lock signal does not indicate a lock, the fine tuning algorithm cycles through the range of reference codes. If the data lock signal indicates a lock, then that particular code is continued to be used for the equalizer.

19 Claims, 4 Drawing Sheets

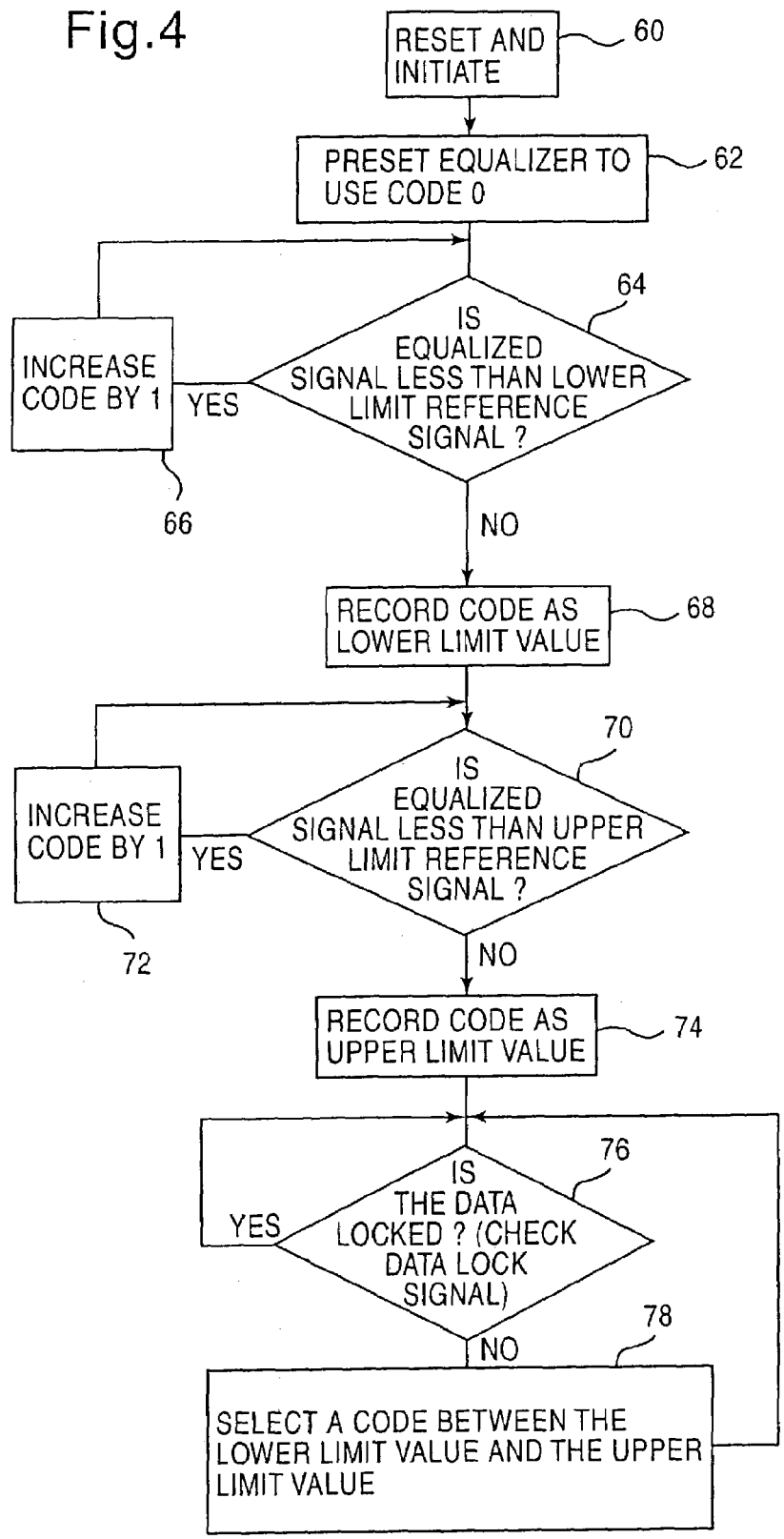

METHODS AND CIRCUITS FOR OPTIMAL EQUALIZATION

PRIORITY CLAIM

This application is a continuation of U.S. patent application Ser. No. 09/415,567, filed Oct. 8, 1999, which issued as U.S. Pat. No. 6,546,047 on Apr. 8, 2003. This application also claims priority to a provisional application entitled "Hybrid Adaptation" filed Oct. 8, 1998, having and application Ser. No. 60/103,820.

BACKGROUND OF THE INVENTION

1. Field of the Invention

The present invention generally relates to circuits and methods for conditioning a received signal, and, in particular, methods and circuits for determining an optimal code for an equalizer of a receiver.

2. Description of the Prior Art

There are several approaches in implementing a receive channel in a communication system using the analog approach (an example of such system is the receive channel for a 100TX Fast Ethernet transceiver). FIG. 1 illustrates a traditional approach where the received signal is compensated by an equalizer 10. The amplitude of the equalized signal is feed to a slicer 12 and an adaptation circuit 16. The adaptation circuit 16 compares the equalized signal with a present reference voltage to determine an error signal. Base on the value of the error signal, the adaptation circuit can adjust the equalizer 10 to a different setting thereby changing the amount of the compensation to the incoming signal. FIG. 2a illustrates an example of the frequency response of a received signal. FIG. 2b illustrates the various taps (also referred to as codes) that may be selected and provided by an equalizer in compensating the received signal. FIG. 2c illustrates the desired result.

The slicer 12 slices the equalized signal with a pre-set voltage that matches the adaptation reference voltage and the sliced signal is then passed to the clock recovery circuit 14. The clock recovery circuit locates the data edge within a time window, locks to the data, and constantly adjusts itself to adapt to the incoming (equalized and sliced) signal. However, if the incoming signal has excessive jitters, the clock recovery circuit may lose the lock on the data.

There are several causes of jitter in this system. First, if the equalized signal mismatches with the fixed slice level, it can cause pulse width distortion of the sliced signal, which translates to clock jitter. Second, the transmitter, communication channel, cable, transformer, etc. can also causes excessive jitter and noise. If the combined jitter becomes large enough, the data edge may no longer be located within the time window centered by the recovery clock and the clock recovery circuit will then lose lock on the data and the data will lost. From the receiver side, there is little that can be done with the second cause of jitter. To reduce the jitter caused by the first cause, in the traditional system, the equalized signal is monitored and the setting for the equalizer is altered accordingly to minimize the error signal when compared against the provided reference signal.

The traditional system is conceptually simple. However, this system heavily relies on amplitude information and it is therefore sensitive to voltage, process, and temperature variation. Especially when the supply voltage becomes lower and lower, it is difficult to ensure that the adaptation circuit can adapt to a working code in all corner conditions.

It is therefore desirable to have a solution that allows the receiver to tolerate and operate reliably under extreme conditions and minimize the effect from voltage, process, and temperature variations.

SUMMARY OF THE INVENTION

It is therefore an object of the present invention to provide reliable receiver circuits and methods minimally affected by voltage, process, and temperature variations.

It is another object of the present invention to provide receiver circuits and methods for optimally compensating a received signal by using a variable adaptive algorithm.

It is yet another object of the present invention to provide adaptation circuits and methods for optimally compensating a received signal and minimizing errors.

Briefly, the present invention discloses methods and circuits utilizing a two stage adaptation algorithm to determine the optimal code to minimize errors. In the first stage, a coarse tuning algorithm is used to choose a range of codes based on the amplitude of the received signal. The chosen codes will be used as reference points in the second stage. In the second stage, a fine tuning algorithm is used to select a code in the range of reference codes determined in stage one. The fine tuning algorithm looks to the status of the data lock signal generated by the clock recovery circuit. If the data lock signal does not indicate a lock, the fine tuning algorithm cycles through the range of reference codes. If the data lock signal indicates a lock, then that particular code is continued to be used for the equalizer.

An advantage of the present invention is that it provides reliable receiver circuits and methods minimally affected by voltage, process, and temperature variations.

Another advantage of the present invention is that it provides receiver circuits and methods for optimally compensating a received signal by using a variable adaptive algorithm.

Yet another advantage of the present invention is that it provides adaptation circuits and methods for optimally compensating a received signal and minimizing errors.

These and other features and advantages of the present invention will become well understood upon examining the figures and reading the following detailed description of the invention.

IN THE DRAWINGS

FIG. 4 illustrates a flow chart detailing the method steps of the preferred embodiment of the present invention.

DETAILED DESCRIPTION OF THE PREFERRED EMBODIMENTS

Figure 1:
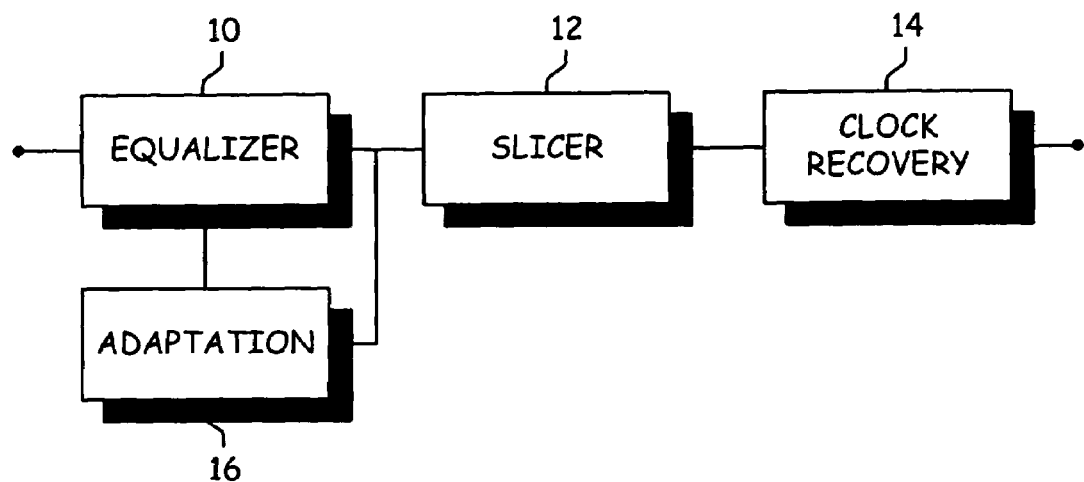
FIG. 1 illustrates a prior art receiver.
Figure 2A:
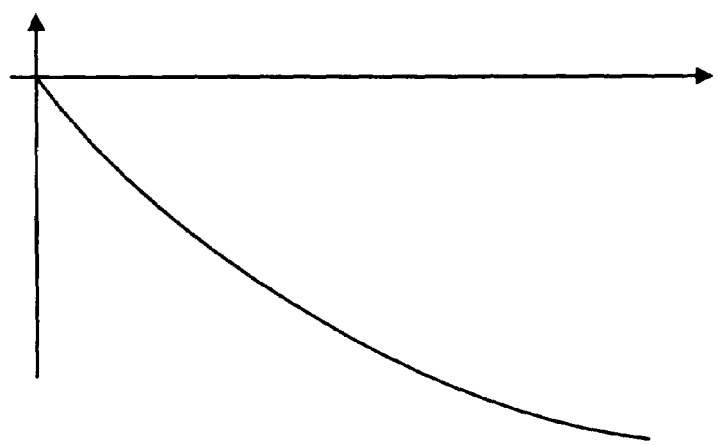
FIGS. 2a-2c illustrate the frequency response of the received signal, the frequency responses of the various compensation signals, and the desired frequency response after compensation.
Figure 2B:
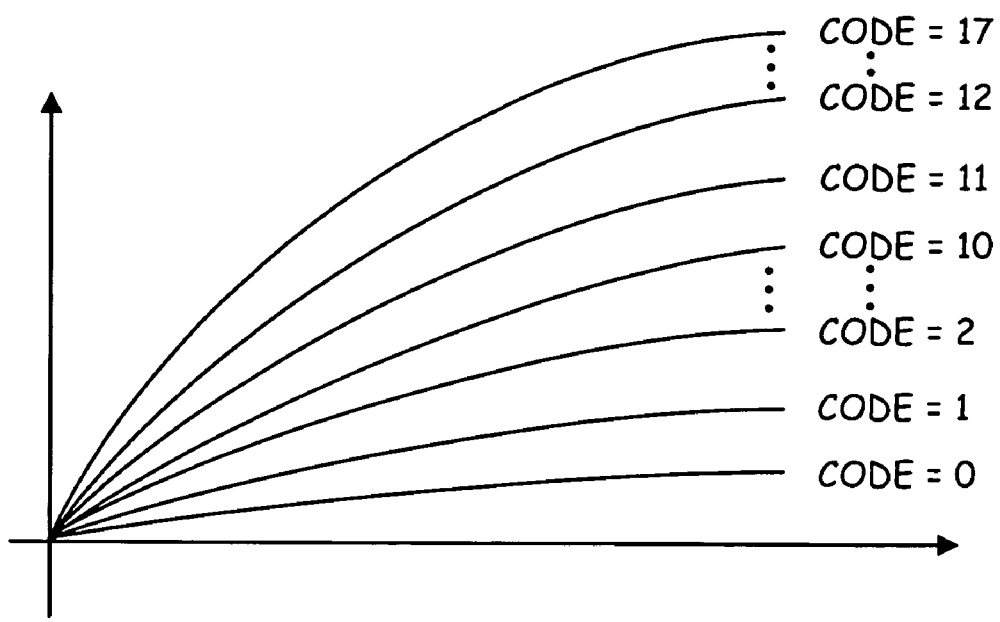
Figure 2C:
Figure 3:
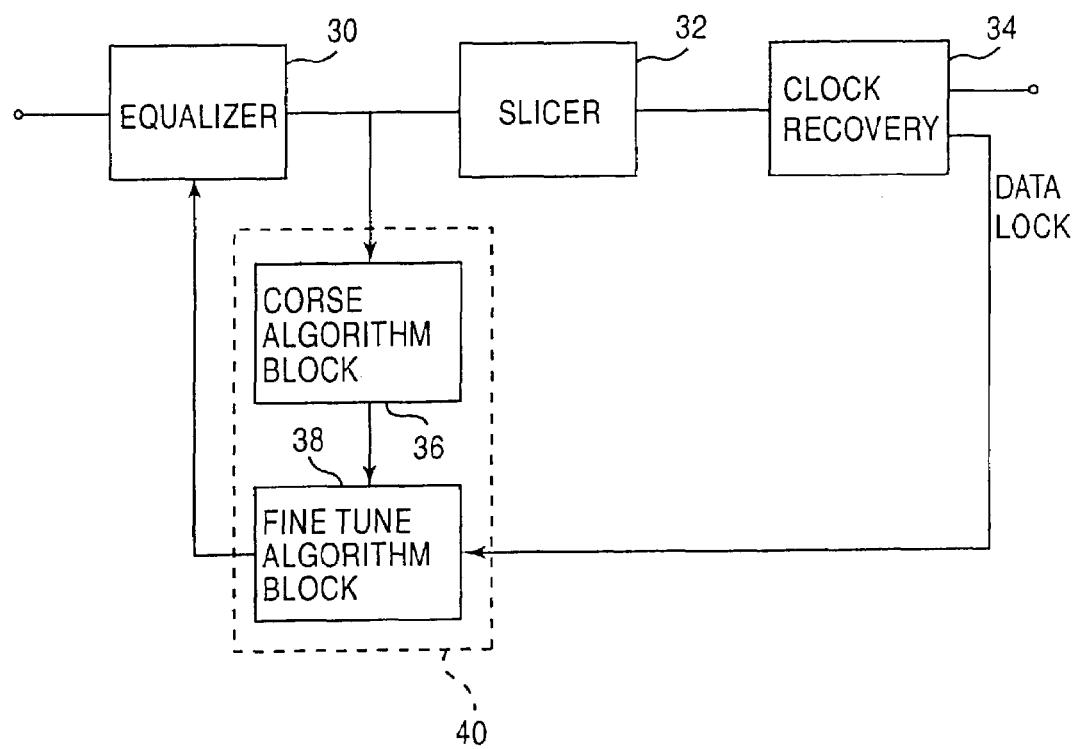
FIG. 3 illustrates a block diagram of the preferred circuit blocks of the present invention.

In a presently preferred embodiments of the present invention, a novel circuit and method for a receiver circuit and adaptation algorithm is disclosed. Referring to FIG. 3, the received signal is first equalized by an equalizer 30. The equalized signal is fed to a slicer 32 and an adaptation circuit 40. The slicer 32 slices the equalized signal and fed it to the clock recovery circuit 34. The clock recovery circuit 34 provides an output and a data lock signal. The adaptation circuit 40 includes two blocks, a coarse algorithm block 36 and a fine tune algorithm block 38. The coarse algorithm block 36 determines a range of codes and the fine tuning block 38 selects a particular code from the range of codes in response to the data lock signal. The selected code is communicated to the equalizer accordingly.

FIG. 4 illustrates a flow chart detailing the algorithm of both coarse tuning and fine tuning in selecting the best code. First, the corresponding circuit to this embodiment is reset and initialized (block 60). In the next step 62, the equalizer is set to use code 0. Then, the equalized signal is compared to a Lower Limit reference signal 64. The Lower Limit reference signal and Upper Limit reference signal are pre-set signals. If the amplitude of the equalized signal is below the amplitude of the Lower Limit reference signal, the code is increased by one 66 and the comparison is made again. If the amplitude of the equalized signal is greater than or equal to the amplitude of the Lower Limit reference signal, the current code value is recorded as the Lower Limit value 68. In the next step 70, the equalized signal is compared to the Upper Limit reference signal. If the amplitude of the equalized signal is below the amplitude of the Upper Limit reference signal, the code is increased by one 72 and the comparison is made again. If the amplitude of the equalized signal is greater than or equal to the amplitude of the Upper Limit reference signal, the current code value is recorded as the Upper Limit value 74. These steps constitute the coarse tuning algorithm. In the next step 76, the data lock signal (generated by the clock recovery circuit) is checked. If the data lock signal indicates that the data (the equalized and sliced signal) is locked, the code currently used by the equalizer is optimal and no action is needed. The check is continuously made to ensure an optimal code. If the data lock signal indicates that the data is not locked, the code currently used by the equalizer is then not optimal and a different code should be selected between the Upper Limit value and the Lower Limit value and communicated to the equalizer 78. The method in selecting a code from the range of code between the Upper Limit value and the Lower Limit value can be any method. A simple method in simply cycling through the range values one at a time can be used or a complex method in determining the direction of the error value can be used as well.

While the present invention has been described with reference to certain preferred embodiments, it is to be understood that the present invention is not to be limited to such specific embodiments. Rather, it is the inventor's intention that the invention be understood and construed in its broadest meaning as reflected by the following claims. Thus, these claims are to be understood as incorporating and not only the preferred embodiment described herein but all those other and further alterations and modifications as would be apparent to those of ordinary skill in the art.

What we claim are:

1. A method of adjusting an equalizer, said method comprising the steps of:
    defining a range of values based on an amplitude of a received signal, thereby providing a defined range of values;
    generating a code within said defined range of values; and
    adjusting said equalizer using the generated code.

2. A method as recited in claim 1, wherein said generating step comprises generating an upper limit value and a lower limit value as a function of an equalized signal received from said equalizer.

3. A method as recited in claim 2, wherein said step of generating said upper limit value is generated as a function of the upper range of said equalized signal.

4. A method as recited in claim 2, wherein said step of generating said lower limit value is generated as a function of the lower range of said equalized signal.

5. A method as recited in claim 3, wherein said step of generating said upper limit value is generated as a function of a pre-defined upper limit reference signal.

6. A method as recited in claim 4, wherein said step of generating said lower limit value is generated as a function of a pre-defined lower limit reference signal.

7. A method as recited in claim 1, wherein said generating step comprises generating said code by selecting a value in the range between an upper limit value and an lower limit value.

8. A method as recited in claim 7, wherein said step of selecting said code comprises selecting said code by cycling through the values between said lower limit value and said upper limit value.

9. A method as recited in claim 1, further comprising receiving a data lock signal and, if said data lock signal does not indicate data lock, generating said code by cycling through the values between said lower limit value and said upper limit value.

10. A method as recited in claim 7, wherein said step of selecting said code comprises selecting said code by cycling up and down between said lower limit value and said upper limit value as a function of an error value.

11. A method as recited in claim 10, wherein said error value is generated from the difference between a pre-defined reference signal and said code.

12. A method of adjusting an equalizer, said method comprising the steps of:
    generating an upper range value and a lower range value from an equalized signal generated by the equalizer based on an amplitude of a received signal;
    generating a code within a range of values, said code being selected by cycling through said range of values defined by said upper range value and said lower range value; and
    adjusting the equalizer based on said code.

13. A method as recited in claim 12, further comprising receiving a data lock signal, and if said data lock signal does not indicate a data lock condition, performing said generating and said code step.

14. A method as recited in claim 12, wherein said generating said code step comprises selecting said code by cycling up and down between said lower range value and said upper range value as a function of an error value.

15. A method as recited in claim 14, wherein said error value is generated from the difference between a pre-defined reference signal and said code.

16. A method of receiving a signal, comprising:
    receiving an input signal and a code by an equalizer;
    generating an equalized signal, based on said input signal and the code;
    receiving said equalized signal by a slicer;
    generating a sliced signal;
    receiving said sliced signal by a clock recovery subcircuit;
    generating an output signal and a data lock signal based on said sliced signal;
    generating an upper range value and a lower range value from said equalized signal, thereby providing a generated upper range value and a generated lower range value; and generating said code within a range of values defined by said generated upper range value and said generated lower range value;

wherein said code indicates an adjustment to said input signal in generating said equalized signal.

17. A method as recited in claim 16, further comprising receiving said data lock signal and, if said data lock signal does not indicate a data lock condition, said step of generating said code comprises selecting said code by cycling within said range of values.

18. A method as recited in claim 17, wherein said step of generating said code comprises selecting said code by cycling up and down between said lower range value and said upper range value as a function of an error value.

19. A method as recited in claim 18, wherein said error value is generated from the difference between a pre-defined reference signal and said code.

* * * * *